United States Patent
Campbell et al.

(10) Patent No.: US 7,325,455 B2
(45) Date of Patent: Feb. 5, 2008

(54) HIGH-TEMPERATURE PIEZOELECTRIC VIBRATION SENSOR ASSEMBLY

(75) Inventors: Lam Campbell, Minden, NV (US); Nicola Fulciniti, Lancaster, NY (US); Michael J. Traphagen, Cheektowaga, NY (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 11/268,731

(22) Filed: Nov. 8, 2005

(65) Prior Publication Data

US 2007/0101814 A1 May 10, 2007

(51) Int. Cl.
*G01P 15/09* (2006.01)
(52) U.S. Cl. ............ 73/514.34; 73/503; 310/319
(58) Field of Classification Search ............ 73/514.34, 73/654, 503; 310/319, 329
See application file for complete search history.

(56) References Cited

U.S. PATENT DOCUMENTS

| | | | |
|---|---|---|---|
| 3,749,946 A | * | 7/1973 | Von Ruti .............. 310/319 |
| 4,085,349 A | * | 4/1978 | Farstad ................ 310/319 |
| 4,085,363 A | * | 4/1978 | Gravina et al. ........... 73/503 |
| 4,835,747 A | | 5/1989 | Billet |
| 6,218,898 B1 | | 4/2001 | Zanetti |
| 6,513,383 B1 | * | 2/2003 | Okano et al. .......... 73/514.34 |
| 6,655,211 B1 | | 12/2003 | Schmid et al. |

FOREIGN PATENT DOCUMENTS

WO   WO 91/06012   5/1991

\* cited by examiner

*Primary Examiner*—John E. Chapman
(74) *Attorney, Agent, or Firm*—Nixon & Vanderhye P.C.

(57) ABSTRACT

An integral connectorless hermetically sealed high-temperature piezoelectric sensor housing and cable assembly includes signal conditioning/processing circuitry having a charge amplifier-differential amplifier combination with integral trim capacitor and/or a voltage divider network in at least one signal processing path to provide the ability to custom adjust input impedances and balance common-mode signals to compensate for inequalities caused by inherent parasitic capacitances and specific structural constraints of the sensor assembly.

13 Claims, 1 Drawing Sheet

HIGH-TEMPERATURE PIEZOELECTRIC VIBRATION SENSOR ASSEMBLY

BACKGROUND OF THE INVENTION

The present invention relates to apparatus and circuitry for producing and processing signals from high-temperature environment sensors, and more particularly, to a method and apparatus for obtaining high quality low-noise velocity and/or acceleration parameter signals from a piezoelectric vibration sensor element used in high-temperature, electrically-noisy environments.

Piezoelectric element sensors are commonly used on industrial machinery and equipment to monitor and detect operating conditions of the equipment to provide early warning and detection of malfunctions and/or failure. One known use is to function as an accelerometer for measuring the vibrations of rotating machines such as gas turbines or jet engines. In applications such as these, environmental conditions at the point of monitoring can be quite harsh. For example, monitoring conditions at various points or parts of a high-power gas turbine power generator or within a nuclear power plant reactor may require monitoring under extremely high-temperature and electrically noisy conditions. In the past, to obtain measurements on gas turbines under such conditions, a piezoelectric/piezo-ceramic sensor used at the point of measurement was mounted in a housing having an integral electrical connector to which was connected a lengthy cable conductor to transfer the signal to remote signal processing electronics located away from the harsh conditions at the sensor. However, moisture and vibration can compromise the signal path from the piezoelectric sensor to the signal processing circuiting creating false vibration data and causing the machine to be unnecessarily shut down. Moreover, during a full-power shutdown, the temperature inside the machine enclosure may exceed the maximum temperature rating of the signal processing electronics requiring additional repair and replacement of components. Some major disadvantages of past arrangements included the ohmic connectors between the sensor and electronics and the limited operational temperature range of the processing electronics, which render the assembly susceptible to noise, false data/signal readings and increased machine downtime.

Typically, the signal conditioning and processing electronics used for piezoelectric sensors includes a charge converter or charge amplifier for detecting and amplifying the small electrical charge or changes in charge developed on the piezoelectric element and a gain amplifier for conditioning the signal and producing a usable output signal indicative of, for example, a vibration parameter such as acceleration. It is conventional to use a differential amplifier, called an operational amplifier (OP AMP), having a very high gain and a very high input impedance for the charge amplifier and gain amplifier stages.

One of the problems with obtaining accurate and reliable signals from a piezoelectric sensor placed in a gas turbine or jet engine is that it is subject to extreme temperatures and electrical noise. The high-temperatures makes it nearly impossible to locate the sensitive signal processing circuitry anywhere near to the sensor head, and the noisy electrical environment makes any long electrical signal cable/conductor connections extremely susceptible to picking up unwarranted electrical noise signals which may alter or interfere the relatively weak signal generated by the piezoelectric sensor element.

Another problem is that the differential amplifiers typically used in such applications are susceptible to unequal common-mode noise signals present at the inputs. A difference in common-mode noise signal strength at each input of the differential amplifier causes unwanted inaccuracies in the output signal. Moreover, the degree of unequal common-mode noise observed is specific to the particular design of the sensor assembly. In particular, a major cause of imbalances in common-mode noise at the differential amplifier inputs is primarily a function of parasitic capacitances within the piezoelectric element stack housing, the sensor-to-processing circuit cable, the processing electronics housing, and from other portions of the sensor assembly.

BRIEF SUMMARY OF THE INVENTION

An apparatus and circuitry is disclosed for obtaining high quality, highly reliable, low-noise acceleration and velocity signals from a piezoelectric based vibration sensor used under high-temperature noisy electrical environmental conditions such as that encountered in aero derivative gas turbines and other high-temperature rotating machinery.

One aspect of the non-limiting exemplary implementation described herein is the provision of a custom tailored high-temperature environment integral sensor housing and cable assembly for obtaining high quality, low-noise signals under harsh environmental conditions, which includes a trim circuit arrangement for eliminating, or at least significantly reducing, the negative effects on sensor signal quality caused by parasitic capacitances and impedance mismatches associated with the sensor element housing and electrical cable portions of the assembly.

One non-limiting exemplary implementation of a high-temperature piezoelectric sensor assembly disclosed herein includes an arrangement for tuning/trimming the signal processing electronics to equalize the common-mode noise signal strength at inputs to the differential amplifier and to compensate for differences in electrical impedance between the cable portion and sensor element. In one example of the disclosed implementation, this is accomplished by using a trim capacitor for each charging amplifier signal channel within the signal processing electronics. In another example of the disclosed implementation this is accomplished by using a voltage divider impedance network at the input of at least one differential amplifier signal channel within the signal processing electronics.

Another aspect of the non-limiting exemplary implementation disclosed herein includes an arrangement for eliminating or at least significantly reducing the susceptibility of a signal processing circuitry for a remote high-temperature piezoelectric sensor assembly to 50-60 Hz noise originating from cable portion between piezoelectric sensor stack and signal processing electronics.

In high-temperature applications, a heat resistant mineral-insulated shielded cable may be used for electrically connecting a piezoelectric sensor to remote signal processing electronics. However, even shielded cabling is susceptible to ambient electromagnetic noise such as, for example, the high level 50-60 Hz background radiations often prevalent in the gas turbine power generator machinery environment. This susceptibility is further exacerbated as cable length increases or if the outer shielding cannot be adequately grounded. Accordingly, another approach taken by the exemplary implementation disclosed herein for optimizing the signal quality obtained from a high-temperature piezoelectric sensor, especially when using two-conductor signal cable from the sensor to the processing electronics, is to minimize the cable length by positioning the amplification/processing electronics as close to the piezoelectric sensor element as possible to reduce the sensor assembly's overall susceptibility to background electromagnetic noise.

A further aspect of the exemplary implementation disclosed herein is the use of "high-temperature" tolerant integrated electronics for the signal processing and conditioning circuitry to allow its placement in closer proximity to the sensor element in high-temperature monitoring environment. For example, the signal processing electronics may be formed as an integrated circuit designed to withstand high-temperature environments. This allows use of shorter signal cable sections, making the entire sensor assembly much less susceptible to electromagnetic noise—especially in the 50-60 Hz radiated electromagnetic spectrum.

Another aspect of the disclosed example implementation is to provide a high-temperature vibration sensor that provides both continuous acceleration and velocity output signals from a single piezoelectric element stack, for enabling the continuous monitoring of a velocity signal while simultaneously providing a separate acceleration signal output for additional machinery diagnostics.

Another aspect of the example implementation for a high-temperature vibration sensor disclosed herein includes an arrangement wherein the high-temperature sensing element housing is separated from the signal conditioning electronics but the signal conditioning electronics are permanently connected to the sensing element via an integral cable without ohmic connections. This connectorless arrangement allows mounting the sensing head on surfaces having very high-temperatures (e.g., an excess of 482° C.) and placing the conditioning/processing electronics in a somewhat cooler location without introducing ohmic electrical connector elements that have an increased potential to compromise signal quality when exposed to heat, moisture and vibration. For example, the housing and cable portions of the sensor assembly may be welded together creating a hermetically sealed insulating assembly without any ohmic electrical connectors in the signal path from the piezoelectric element to the amplifying/conditioning circuitry. Conventionally, sensor elements and signal cable portions were interconnected using detachable connectors. That arrangement made the assembly susceptible to noise due to moisture contamination or loose connection. Since connector problems are a significance source of unwanted noise signals and transducer failures, by eliminating all such ohmic connections between the sensing head and the signal conditioning/processing electronics, a significant improvement in signal quality and reliability is realized.

A still further aspect of the exemplary implementation disclosed herein is the use of a high-temperature tolerant signal processing/conditioning integrated circuit component that is rated to operate at temperatures of up to at least 125° C. and is survivable to prolonged exposures to elevated temperatures of up to at least 155° C. without sustaining permanent damage. The use of high-temperature rated conditioning/processing electronics allows its placement in a location closer to, yet cooler than, the position of the piezoelectric sensing element, which permits use of a shorter signal cable for reducing the susceptibility of the sensor assembly to ambient electromagnetic noise.

DETAILED DESCRIPTION OF THE INVENTION

Figure 1:
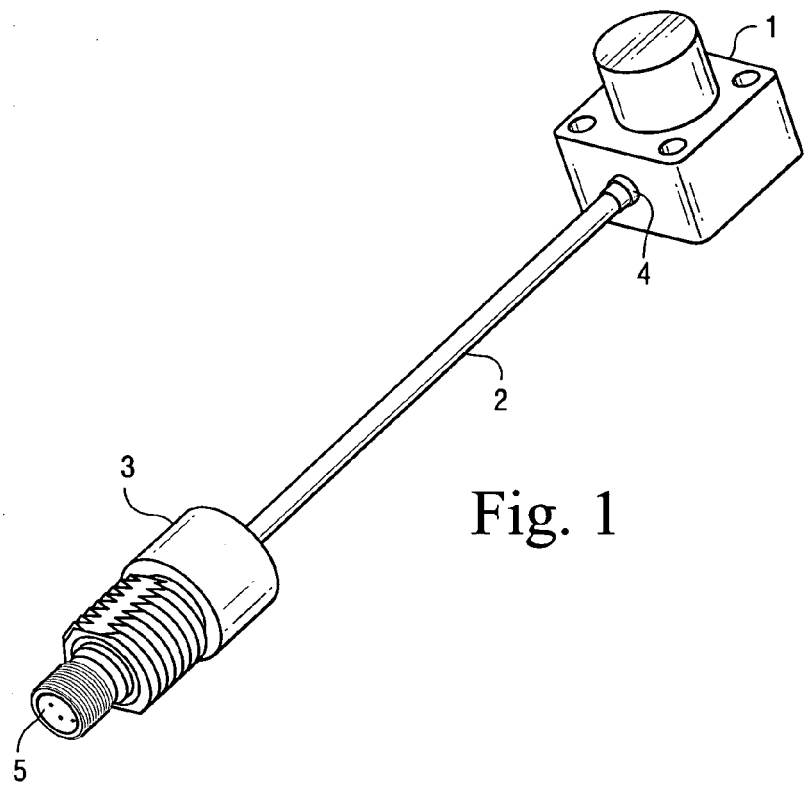
FIG. 1 shows a perspective view of an example high-temperature vibration sensor assembly.

FIG. 1 shows a perspective view of an example implementation of a hermetically sealed high-temperature vibration sensor assembly for producing both velocity and acceleration parameter output signals. The sensor assembly includes a piezoelectric element stack housing portion 1, an electrically shielded mineral-insulated dual conductor hardline cable portion 2 and a signal conditioning/processing circuit housing portion 3 having an integral multi-pin signal output/power connector 5. A vibration sensitive piezoelectric element stack (not shown) mounted in hermetically sealed housing portion 1 at a head-end of cable portion 2 outputs a charge signal that is proportional to vibration induced motions of head-end housing portion 1. This charge is transferred through a low-noise, integral cable portion 2 to signal conditioning/processing circuitry on an integrated circuit (IC) chip (not shown) which is mounted in a second hermetically sealed housing portion 3 at the opposite end of cable 2.

In the non-limiting example implementation disclosed herein, the signal conditioning/processing circuit includes at least one pair of charge amplifiers coupled to a differential amplifier and a buffer output amplifier. A charge signal generated by the piezoelectric element mounted in sensor head-end housing portion 1 is transferred to the signal conditioning/processing circuitry via a dual conductor mineral-insulated shielded cable 2 which is permanently joined at each end to housing portions 1 and 3, for example, via non-removable welded attachment points 4. (Welded attachment point at housing portion 3 not shown.) The charge amplifier-differential amplifier arrangement in the signal processing circuitry converts low-level, high impedance charge signals generated by the piezoelectric element to a calibrated low-impedance current or voltage signal that is proportional to vibration induced accelerations experienced by the piezoelectric element. Integrating buffer amplifier circuitry is also included on the signal conditioning/processing IC to provide a separate output signal that is proportional to a vibration velocity parameter. In addition, specific signal filtering/trim circuitry is provided in the charge amplifier-differential amplifier stage (discussed below) with respect to FIG. 2 to enable correction for parasitic capacitances, impedance mismatches and to compensate for inequalities in common-mode signal strengths. Circuitry for performing other signal filtering functions may also be included on the IC chip as well.

Figure 2:
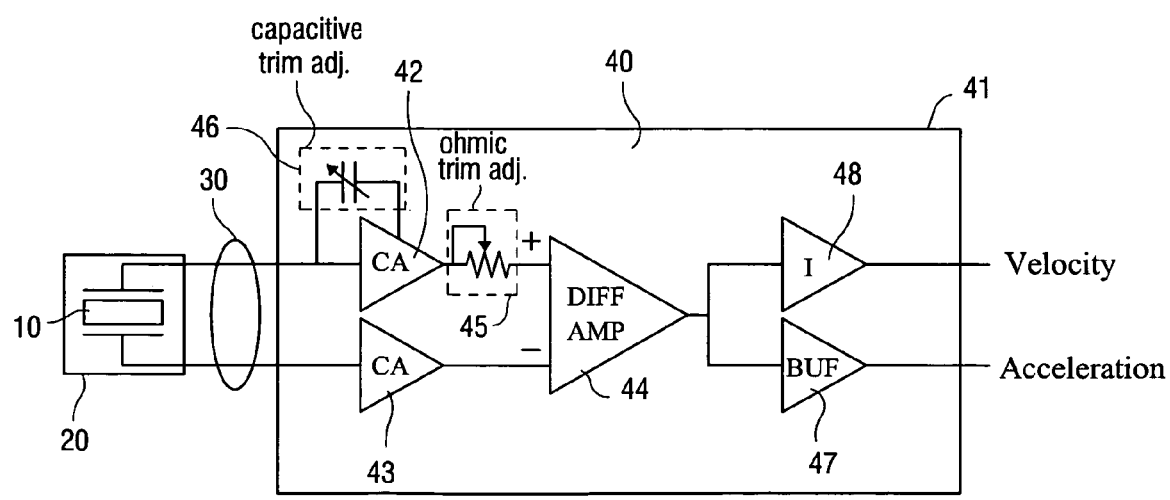
FIG. 2 is a schematic circuit block diagram illustrating the piezoelectric transducer element and associated signal conditioning/processing electronics components.

FIG. 2 shows a circuit schematic 40 of an example implementation of the signal conditioning/processing circuitry, which is preferably fabricated on one or more high-temperature tolerant IC chips that are mounted in a hermetically sealed housing portion 3 (FIG. 1) having an integral output connector 5. Referring again to FIG. 2, a piezoelectric element stack 10 produces a charge signal on a pair of output electrodes in response to vibrations experienced at head-end housing portion 20. This charge signal from the stack output electrodes is transferred via a dual conductor mineral-insulated cable 30 to signal conditioning/processing electronics 40 in hermetically sealed shielded housing portion 41 (housing portion 3 in FIG. 1). The dual conductors of cable 30 provide the charge signal to a pair of charge amplifiers 42 and 43 connected to the inputs of a differential amplifier 44.

Charge amplifiers 42, 43 and differential amplifier 44 are conventional high-gain, high-input impedance operational amplifiers (OP AMPS) and function to convert the charge signal from piezoelectric element 10 to a low-impedance voltage or current signal. The signal output from differential amplifier 44 is then provided to a buffer amplifier 47 and an integrating amplifier 48 to provide output voltage signals that are respectively proportional to acceleration and velocity components of the vibrations experienced by piezoelectric element sensor 10.

A resistor trim/adjustment circuit 45 is provided on at least one input of differential amplifier 44 to allow for precision balancing/trimming of common-mode voltage differences that may be present at the inputs of differential amplifier 44. Although depicted as a variable resistor in FIG. 2, trim circuit 45 may comprise a conventional resistor divider network for performing the same function. Alternatively, or in addition to trim circuit 45, a capacitance trim/adjustment circuit 46 may be provided in the feedback circuit of either charge amplifier 42 or 43.

In order to calibrate processing circuit 40 for a particular application, a common-mode test signal is induced at piezoelectric element 10 in a prototype sensor assembly that is specifically custom designed and constructed for a particular application/machine. For example, among other things, a specific length cable portion 30 may be required for a particular application. Based on the test signal received at the signal processing circuitry, customized values for capacitance and/or resistance for trim circuits 45 and/or 46 are determined to eliminate common-mode signal differences and to match the input impedances to processing circuit 40 for both conductor leads from cable 30. Once the custom trim adjustment for circuit 45 and/or 46 of the prototype assembly is determined, the processing circuitry 40 can be produced in IC form for placement in hermetically sealed housing portion 41 of the sensor assembly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A high-temperature environment velocity and acceleration sensor, comprising:
   at least one piezoelectric element stack mounted within a first high-temperature resistant hermetically-sealed housing;
   a dual conductor cable;
   an integrated signal processing circuit mounted within a second high-temperature resistant hermetically-sealed housing and electrically connected to said piezoelectric element stack via said cable, said signal processing circuit comprising:
   a charge amplification stage comprising at least one pair of charge amplifiers, the input of each charge amplifier of said pair being electrically connected to said at least one piezoelectric element stack;
   a differential amplifier stage having two inputs, an output of each charge amplifier of said pair of charge amplifiers being connected to a different one of said two inputs of the differential amplifier;
   an ohmic voltage divider trim network connected between at least one charge amplifier output and an input of the differential amplifier, wherein the trim network enables precision custom equalization of common-mode signal strength at an input of the differential amplifier stage; and
   a buffer amplifier and a voltage integrating amplifier both within said second hermetically-sealed housing each connected to the output of said differential amplifier stage for respectively providing both an acceleration signal output and a velocity signal output from said second hermetically-sealed housing.

2. The high-temperature environment velocity and acceleration sensor of claim 1, wherein the dual conductor cable is a hard-line cable.

3. The high-temperature environment velocity and acceleration sensor device of claim 1, wherein the piezoelectric element stack is electrically coupled to the signal processing circuit via a dual conductor cable having permanent non-ohmic connections to said element stack and said processing circuit.

4. The high-temperature environment velocity and acceleration sensor of claim 2, wherein the first housing and the second housing are permanently joined to the dual conductor cable, thereby eliminating any ohmic connections between the piezoelectric element and signal processing circuit electronics.

5. The high-temperature environment velocity and acceleration sensor of claim 1, wherein the cable between the piezoelectric element transducer and the processing electronics is a mineral-insulated cable having an over-braided metal protection sheathing.

6. The high-temperature environment velocity and acceleration sensor of claim 1, wherein said integrated signal processing circuit is mounted within said second hermetically-sealed housing situated at an opposite end of said cable from said first housing, said second housing having a single integral electrical connector for providing separate velocity and acceleration output signals from said processing circuit.

7. The high-temperature environment velocity and acceleration sensor of claim 1, wherein said integrated signal processing circuit is fabricated of high-temperature resistant materials.

8. A high-temperature environment velocity and acceleration sensor, comprising:
   at least one piezoelectric element stack mounted within a first high-temperature resistant hermetically-sealed housing;
   a dual conductor cable;
   an integrated signal processing circuit mounted within a second high-temperature resistant hermetically-sealed housing and electrically connected to said piezoelectric element stack via said cable, said signal processing circuit comprising:
   a charge amplification stage comprising at least one pair of charge amplifiers, the input of each charge amplifier of said pair being electrically connected to said at least one piezoelectric element stack;
   a differential amplifier stage having two inputs and an output of each charge amplifier of said pair being connected to a different one of said inputs of the differential amplifier; and
   a capacitive feed-back trim adjustment network connected to at least one charge amplifier, wherein the trim network enables precision custom equalization of common-mode signal strength to an input of the differential amplifier; and
   a buffer amplifier and a voltage integrating amplifier both within said second hermetically-sealed housing each connected to the output of said differential amplifier stage for respectively providing both an acceleration signal output and a velocity signal output from said second hermetically-sealed housing.

9. The high-temperature environment velocity and acceleration sensor device of claim 8, wherein the piezoelectric element stack is electrically coupled to the signal processing circuit via a dual conductor cable having permanent non-ohmic electrical connections to said element stack and said processing circuit.

10. The high-temperature environment velocity and acceleration sensor of claim 8, wherein the first housing and the second housing are permanently joined to the dual conductor cable, thereby eliminating any ohmic connections between the piezoelectric element and signal processing circuit electronics.

11. The high-temperature environment velocity and acceleration sensor of claim 8, wherein the cable between the piezoelectric element transducer and the processing electronics is a mineral-insulated cable having an over-braided metal protection sheathing.

12. The high-temperature environment velocity and acceleration sensor of claim 8, wherein said integrated signal processing circuit is mounted within said second hermetically-sealed housing situated at an opposite end of said cable from said first housing, said second housing having a single integral electrical connector for providing separate velocity and acceleration output signals from said processing circuit.

13. The high-temperature environment velocity and acceleration sensor of claim 8, wherein said integrated signal processing circuit is fabricated of high-temperature resistant materials.

* * * * *